(No Model.)
E. WESTON.
ELECTROMETER.
No. 530,145.  Patented Dec. 4, 1894.
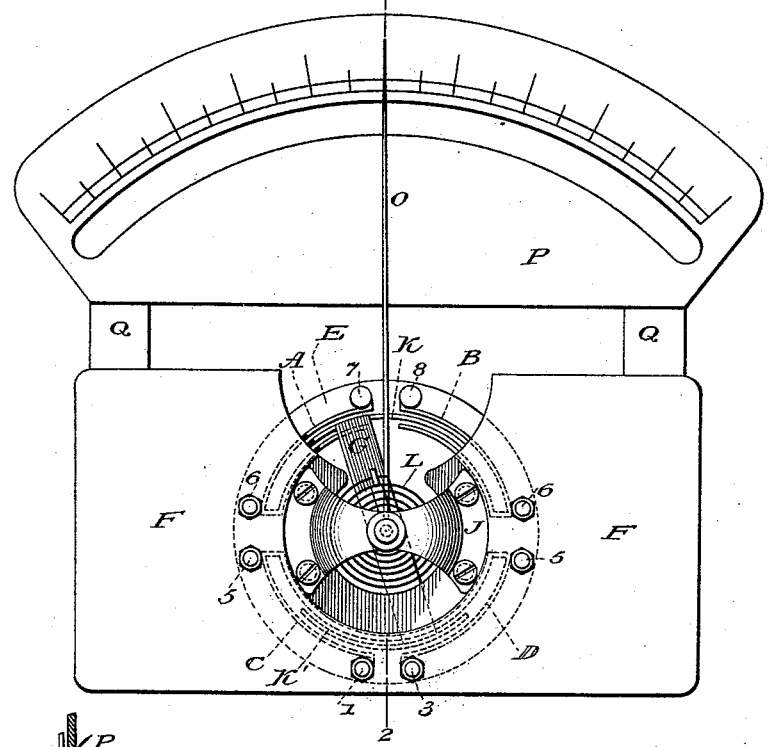
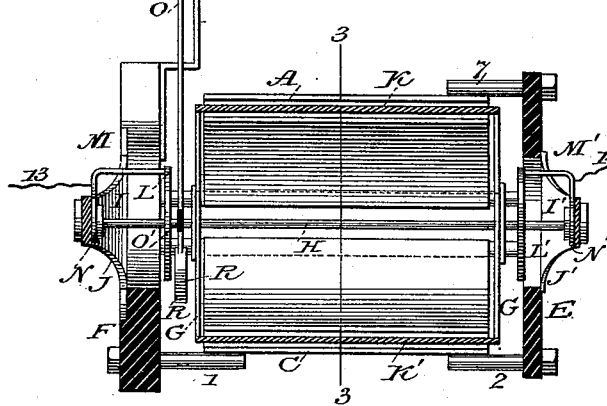
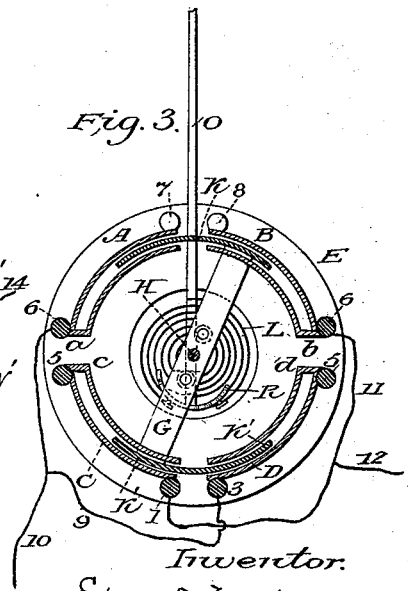
Witnesses:
Inventor:
Edward Weston
by Park Benjamin
his atty.

UNITED STATES PATENT OFFICE.

EDWARD WESTON, OF NEWARK, NEW JERSEY.

ELECTROMETER.

SPECIFICATION forming part of Letters Patent No. 530,145, dated December 4, 1894.

Application filed April 26, 1893. Serial No. 471,991. (No model.)

*To all whom it may concern:*

Be it known that I, EDWARD WESTON, of Newark, Essex county, New Jersey, have invented a new and useful Improvement in Electrometers, of which the following is a specification.

My invention relates to an instrument for accurately measuring differences of electrical potential. Its principle is the same as that of the well-known quadrant electrometer of Sir William Thomson, which will be found described in probably any standard text-book relating to electrical measuring instruments. That apparatus, briefly described, consists of a circular, flat, shallow box divided into four segments which are fixed so as to be separated one from the other by an air-space. The alternate segments are electrically connected and they are placed horizontally. Suspended within this box is a light, aluminium needle shaped like a double canoe-paddle and so arranged that in its normal or rest position it stands along the line of one of the slits or intervals extending between the segments or quadrants of the box. The mode of suspending the needle is usually by two parallel, silk fibers, so that the instrument must always be adjusted in a certain and definite upright position and carefully leveled in order that the needle may, by gravity, assume its proper place. If the needle is electrified and the quadrants are in their normal unelectrified condition and are placed as above stated symmetrically with reference to the needle, no effect will be produced on the latter. If, however, one pair of the connected quadrants be electrified so as to be brought to a certain potential while the other pair of alternating quadrants are maintained at some other and lower potential, the needle will be acted upon by a couple due to the electrical field, which couple will deflect the needle until the restoring couple, due to the twisting of the two parallel silk fibers, is sufficiently great to give equilibrium. If the potential V of the needle be known and if the constants of the instrument be known, then the difference of potential $B'-B^2$ could be calculated from the observed deflection; or, if the instrument be suitably calibrated, this difference of potential can be read off in volts directly upon a scale which shows the extent of deflection of the needle.

In all forms of the Thomson instrument depending, as it does, upon the suspension of the needle by a filament and the balancing of the needle deflection against the torsional resistance of that filament or two filaments, many practical difficulties are encountered. The instrument being necessarily of much delicacy, great care is required in its transportation and handling. For operation, it must be accurately leveled and adjusted in position. By reason of its mode of suspension, the needle is difficult to adjust with accuracy as close to the quadrant surface as is possible without touching, and it is equally difficult to maintain the needle in that relation after the adjustment is once made. It is also difficult to adjust the needle to its normal position of rest; this, in some forms of the Thomson instrument requiring the use of a separate controlling magnet. So also the index arrangement is complicated and in many instances requires the use of a mirror which reflects a spot of light over a scale. It is also common in the Thomson electrometer to attach to the bottom of the needle a long platinum wire supporting a weight, which, with the lower part of the wire, is immersed in sulphuric acid. This wire becomes itself electrostatically charged and is therefore a source of error in the apparatus.

In my present instrument all of these difficulties and many others which will readily suggest themselves to electrical engineers familiar with the use of the Thomson instrument are obviated; and the quadrant electrometer, instead of being an instrument of great structural delicacy, to be handled, practically, only in the laboratory, is rendered as strong and simple in construction and as easily portable and managed as is any ordinary voltmeter. At the same time, the relative accuracy of the instrument is in nowise impaired and possibly is enhanced; and furthermore, it is rendered susceptible of direct reading and does not involve the use of any zero method.

The construction by which these results are achieved consists first in arranging the needle on a fixed pivot support whereby its surface is held in an exact and permanent relation to the quadrants or electrodes and as near to the surfaces of said quadrants as is mechanically possible. As the electrical capacity bears a relation to the diminished distance between these surfaces, any device which will enable them to be placed and maintained in the closest proximity augments the accuracy and delicacy of the apparatus. At the same time, I do away with the filament suspension, thus no longer depending upon gravity nor upon an exact leveling or adjustment of the instrument to give the needle its proper position. In place of opposing the impressed movement of the needle by the resistance of the twisting filament, I balance it against the resiliency of a very delicate spiral spring, and I conduct the electrifying charge to the needle through this spring; or, if two springs be used, as is preferable, through both springs. By means of these springs, the resistance of which is easily regulated, it is possible, with great facility, to adjust the needle to its normal position. Finally, the indications of the apparatus are afforded by an ordinary index-finger applied directly to the pivot shaft which carries the needle of the instrument, which index-finger moves over an ordinary scale which is suitably calibrated and marked in volts or other units, as desired. This index-finger is insulated from its supporting shaft.

In the accompanying drawings, Figure 1 is a plan view of the instrument. Fig. 2 is a sectional view on the line 2, 2 of Fig. 1, and Fig. 3 is a sectional view on the line 3, 3 of Fig. 2, looking toward the scale-end of the apparatus.

Similar letters and figures of reference indicate like parts.

A, B, C, D are the quadrants of the instrument and may be regarded as consisting of a double cylinder of thin metal, such as copper, divided into four parts longitudinally so as to produce the quadrants named. The two portions of each cylinder which forms a quadrant are united, as shown at $a, b, c, d$; so that each quadrant, in fact, forms a box open on three sides, or substantially a folded over plate. These quadrants are secured to the back-plate E and the front plate F of the instrument, both of which plates are of insulating material, in the following manner: The quadrants C and D have attached to them, at their lower portions, short metal rods or bolts, as 1 and 2, Fig. 2. The bolt 1 on quadrant C is secured to the front plate F; the bolt 2 on quadrant C to the rear plate E. On quadrant D there is a similar pair of bolts, one of which is shown at 3, which are attached to the front and rear plates in like manner. On the upper edge of each quadrant, as C and D, is a long bolt, 5, which extends through and is secured to both the front and back plates E and F. Similar long bolts, 6, are secured to the lower edges of the quadrants A, B, and these are fastened to the front and back plates in the same way as are the bolts 5. Finally, at their upper edges the quadrants A and B are provided with short bolts, 7 and 8, Fig. 1, which are secured to the rear plate E. It will be noticed that these quadrants A and B have no front bolts corresponding to the bolts 1 and 3 of the quadrants C and D. It will be apparent that by means of the bolts named, the front and back plates E and F are secured firmly together, and the quadrants are also maintained in definite and fixed position with reference to the frame of the instrument. The whole fixed portion of the apparatus is therefore very strongly and firmly put together, and also so disposed that there is no possibility of the relation of the parts, one to the other, becoming altered.

The needle of the instrument consists of a light, aluminium frame, G, which is supported upon the pivot shaft H. The ends of this shaft are stepped in jeweled bearings, I, which are held in suitable caps or brackets, J J', supported on the front and rear plates F and E. The needle further consists in curved aluminium plates, K K', which are supported upon the sides of the frame G and which are so disposed that the plate K enters the quadrants A and B and the plate K' enters the quadrants C and D.

Attached to the pivot shaft H is one end of a spiral spring, L, the other end of which spring is fastened to a bent arm, M, which is received upon an insulating collar, N, which surrounds the step I. This construction is the same at both ends of the pivot shaft H; the step I', spring L', arm M', and collar N', being similarly arranged to the step I, spring L, arm M, collar N. Also supported on the pivot shaft H and insulated therefrom by a collar, O', is an index O, which is arranged in front of a suitable scale, P, which is carried on brackets, Q, fastened to the front plate F.

The object of insulating the index O from the shaft is to prevent its receiving any of the charge communicated to the instrument. It is important not to confuse the index O with the part of the instrument which is technically called the "needle," and which consists of the frame G and curved plates K. The connections of the quadrants of this instrument are the same that are usually made for the well-known Thomson instrument; that is to say, alternate quadrants, as A, D and B, C, are connected by a wire.

As shown in Fig. 3, the bolt 6 on quadrant A and the bolt 3 on quadrant D are connected by a wire, 9, which in turn connects with the main conductor 10, and the bolt 6 on quadrant B and the bolt 1 on quadrant C are connected by a wire, 11, which in turn connects with the main conductor 12. The charge is communicated to the needle, as shown in Fig. 2, by a conductor, 13, connecting with arm M and another conductor, 14, connecting with arm M'; so that the charge proceeds from one arm, as M, through the spring L to the needle, and thence from the needle through the spring L' to the conductor 14.

The terminals between which it is desired to measure the potential difference may be connected, as usual, to the conductors 10 and 12, thereby producing a difference of potential between the pairs of quadrants B C and A D; or the needle and one pair of quadrants may be connected so as to be charged to one potential, and the other pair of quadrants to another potential. In either case the needle will be deflected from its position of rest and will move against the resiliency of the springs L L' until a new position of equilibrium is obtained. The index O being carried with the needle will simultaneously move over its scale, and thus indicate the extent of deflection, and hence the potential difference.

I desire to call particular attention to the fact that the charge is communicated to the needle through the coiled spring, and therefore positively. It will also be apparent that the needle can be easily constructed so that the curved plates K K' may be adjusted once for all in the closest possible proximity to the quadrant surfaces, and that this proximity will be the same for all positions of the needle. There being no filament suspension to become altered in length through any cause, but on the contrary, the needle being rigid, it follows that the position of the needle with reference to the quadrant surfaces will always be the same; and thus the sensitiveness of the instrument, depending upon this feature, may be secured once for all and kept uniform. On the index O and on the other side of its point of connection to the pivot shaft H is a light brass frame, R, by means of which the overpoise weight of the index O is counterbalanced, so that the gravity of the long index itself will not affect the movement of the needle.

It will be apparent from the foregoing description that the instrument is constructed in an eminently portable form, and that it may be used in any position. So also, inasmuch as the relation of the various parts is either fixed or easily adjustable by the simple regulation of the spring L, the calibration of the instrument scale is rendered free from difficulty and the instrument therefore may be graduated at once for direct reading in volts.

By the term "electrodes" as herein used I mean the fixed bodies which in an electrometer are brought to different potentials, and the potential difference between which is measured by the instrument.

Within the term "electrometer" I include the instruments commonly known as "electroscopes."

I claim—

1. In an electrometer, containing two fixed electrodes and a movable body susceptible of electrification and disposed in invariable inductive proximity to said electrodes, a resilient or elastic body communicating with said movable body and opposing and counterbalancing the movement thereof due to the electrical field.

2. In an electrometer, containing two fixed electrodes and a movable body susceptible of electrification and disposed in invariable inductive proximity to said electrodes, a resilient or elastic body communicating with said movable body and opposing and counterbalancing the movement thereof due to the electrical field, and circuit connections whereby the electrifying charge is communicated to said movable body through said resilient or elastic body.

3. In an electrometer, two fixed electrodes and disposed each with a surface in the same plane, a movable body susceptible of electrification and rigidly supported in close and invariable inductive proximity to said surfaces of said electrodes, and a resilient or elastic body communicating with said movable body and opposing and counterbalancing the movement thereof due to the electrical field in a direction substantially parallel to the plane of said surfaces.

4. In an electrometer, a body susceptible of electrification, a rotary or vibratory shaft disposed in fixed bearings supporting said body, two fixed electrodes disposed in inductive proximity to the path of rotary or vibratory movement of said movable body, and a resilient or elastic body opposing and counterbalancing the rotary or vibratory movement of said movable body due to the electrical field.

5. In an electrometer, a body susceptible of electrification, a rotary or vibratory shaft disposed in fixed bearings supporting said body, two fixed electrodes disposed in inductive proximity to the path of said movable body, and a coiled spring interposed between said rotary shaft and an abutment and opposing and counterbalancing the movement of said shaft.

6. In an electrometer, containing two fixed electrodes, a movable body susceptible of electrification and disposed in invariable inductive proximity to said electrodes and a resilient or elastic body communicating with said movable body and opposing and counterbalancing the movement thereof due to the electrical field, an indicating device controlled by said movable body and showing by direct reading the extent of movement of said body.

7. In an electrometer containing two fixed electrodes, a movable body susceptible of electrification and disposed in invariable inductive proximity to said electrodes, and a resilient or elastic body communicating with said movable body and opposing and counterbalancing the movement thereof due to the electrical field, an index or pointer controlled by said movable body and a scale graduated in electrical units, whereby the difference in potential existing between said electrodes may be directly read.

8. In an electrometer, two fixed, curved electrodes disposed on the circumference of a circle, a centrally pivoted body susceptible to electrification having its outer surface parallel to the surface of said electrodes and in close proximity thereto and a coiled spring connected to said body and to an abutment and opposing and counterbalancing the movement of said body, due to the electrical field, and circuit connections whereby the electrifying charge is communicated to said pivoted body through said spring.

9. In an electrometer, two fixed, curved-plate electrodes disposed on the circumference of a circle, a centrally pivoted shaft, a curved metal plate supported on said shaft having its surface parallel to the surface of said electrodes and in close proximity thereto, a coiled spring connected to said shaft and to an abutment and opposing and counterbalancing the rotary or vibratory movement of said shaft due to the electrical field, an index carried by said shaft and a fixed scale showing the extent of movement of said index.

10. In an electrometer, two fixed, curved electrodes, as A and B, each consisting of a plate substantially turned or folded back on itself, and disposed on the circumference of a circle, a centrally pivoted shaft, a radial arm on said shaft, a metal plate, as K, carried by said arm and entering the electrodes A and B, and circuit connections whereby said plate K may be electrified.

11. In an electrometer, the combination of the fixed, circularly-disposed electrodes, as A D and B C, the centrally-pivoted shaft H, the curved plates K K' carried by said shaft and entering said electrodes, the coiled spring L counterbalancing and opposing the motion of said shaft and circuit connections, substantially as described.

12. In an electrometer, containing two fixed electrodes and a movable body susceptible of electrification and disposed in inductive proximity to said electrodes, a resilient or elastic body communicating with said movable body and opposing and counterbalancing the movement thereof due to the electrical field, and means for adjusting the elasticity or tension of said body.

13. In an electrometer, containing two fixed electrodes and a movable body susceptible of electrification and disposed in inductive proximity to said electrodes, a resilient or elastic body connected to said movable body and opposing and counterbalancing the movement thereof due to the electrical field and means for adjusting said movable body into normal or initial position by varying the elasticity or tension of said resilient body.

14. In an electrometer, a body susceptible of electrification, a rotary or vibratory shaft disposed in fixed bearings supporting said body, two fixed electrodes disposed in inductive proximity to the path of said movable body, an adjustable abutment and a coiled spring connected to said rotary shaft and to said abutment; whereby by the adjustment of said abutment the tension or elasticity of said spring may be varied.

15. In an electrometer containing a movable electrode and a fixed electrode relatively disposed in inductive proximity, an index actuated by said movable electrode and showing the extent of movement thereof; the said index being insulated, and thus not receiving charge, from the remainder of the apparatus.

16. In an electrometer containing two fixed electrodes and a movable body susceptible of electrification and disposed in inductive proximity to said electrodes, an index for showing the extent of movement of said movable body supported by said body and insulated therefrom.

EDWARD WESTON.

Witnesses:
H. R. MOLLER,
M. BOSCH.